United States Patent [19]

Nagasawa et al.

[11] 3,716,408
[45] Feb. 13, 1973

[54] PROCESS FOR PREPARING A LACTULOSE POWDER

[75] Inventors: Taro Nagasawa; Takuji Kawashima, both of Tokyo; Koyoshi Suzuki, Taniyama; Kouzo Kawase, Tokyo, all of Japan

[73] Assignee: Morinaga Milk Industry Co., Ltd., Tokyo, Japan

[22] Filed: Oct. 1, 1971

[21] Appl. No.: 185,885

[30] Foreign Application Priority Data

May 31, 1971 Japan..................................46/37019

[52] U.S. Cl......................127/46 R, 99/141, 127/29
[51] Int. Cl................................................C13k 9/00
[58] Field of Search......99/141; 127/29, 30, 42, 46 R

[56] References Cited

UNITED STATES PATENTS

| 3,505,309 | 4/1970 | Carubelli | 127/46 R |
| 3,546,206 | 12/1970 | Guth | 127/30 X |
| 3,562,012 | 2/1971 | Reinicke | 127/46 R |

FOREIGN PATENTS OR APPLICATIONS 1,189,839  3/1965  Germany

OTHER PUBLICATIONS

"Chemical Abstracts," 63;6250a, (1965).

*Primary Examiner*—Morris O. Wolk
*Assistant Examiner*—Sidney Marantz
*Attorney*—Norman F. Oblon et al.

[57] ABSTRACT

A lactulose powder containing above 55 percent of lactulose in solid content, is obtained by mixing an aqueous solution having a pH of less than 7.0 and which contains above 60 percent of lactulose in total solid content, with an aqueous solution having dissolved therein, about 0.3 percent, based on the weight of said lactulose, of konnayaku powder, and drying the resulting mixture.

1 Claim, No Drawings

PROCESS FOR PREPARING A LACTULOSE POWDER

BACKGROUND OF THE INVENTION

1. Field Of The Invention

The present invention relates to a process for preparing a lactulose powder. More particularly, the present invention relates to a process for preparing a lactulose powder containing above 55 percent by weight, of lactulose in solid content, characterized by mixing an aqueous solution, containing above 60 percent, by weight, of lactulose in total solid content, and having a pH of below 7.0 with an aqueous solution, having dissolved therein above 0.3 percent, based on the weight of lactulose, of konnyaku powder (Amorphophalus Konjac K) and drying the resulting mixture.

2. Description Of The Prior Art

Lactulose is especially effective for constipation and hepatic encephalopathy. Also from various clinical experiments, it has been established that the addition of lactulose to a milk powder for infants gives predominant amounts of *L. bifidus* in the intestinal flora which is the same as that of infants fed with human milk. Thus, lactulose is worthy of note as a medicament or as an additive for foodstuffs. However, lactulose has heretofore been used mainly in the form of a syrup, due to its hydroscopic character, and the crystallization of lactulose is a difficult matter. If the lactulose powder was obtained by ordinary spray drying, it tends to easily turn into syrup. A process for preparing a lactulose powder in a concentration of below 50 percent of lactulose in solid content, has been disclosed in the Japanese Pat. Publication Gazette No. 861/1965. The process described in this Gazette is a process which utilizes a grain powder, in particular, a rice powder, as an agent for the drying of an aqueous solution of lactulose. However, it was impossible to obtain a powder containing above 50 percent, by weight, of lactulose in total solid content by that process. In another process for preparing lactulose by the epimerization of lactose, various studies have been made using alkaline agents or their combinations and various manufacturing conditions have been investigated to obtain an aqueous solution of lactulose containing above 50 percent, by weight, of lactulose in solid content. Therefore, in the process described in the above-mentioned Gazette, an aqueous solution containing above 50 percent, by weight, of lactulose in total solid, cannot be converted into a good powder unless a carbohydrate such as lactose is added thereto, and thus that process suffers the disadvantage that the lactulose content in the powder product is reduced.

SUMMARY OF THE INVENTION

The object of the present invention is to provide a process for preparing a powder which contains lactulose in a concentration as high as above 55 percent, by weight, in solid content, and is as high in free flowability as in powders obtained by conventional methods.

The present inventors have now found that the above mentioned defects in the conventional processes for preparing a lactulose powder can be improved by the use of konnyaku powder. Konnyaku powder is derived from the corm of a perennial herb, "Amorphophalus Konjac," belonging to the Araceae family and is mostly carbohydrate composed of mannan. The present inventors have prepared an aqueous solution of lactulose by using the method of L.Gatzsche and H. Hänel (Ernährungsforschung, Vol. 12, No. 4, Page 641, 1967) by removing the lactose and galactose, to as large an extent as possible, by crystallization to obtain an aqueous lactulose solution having a pH of 6.5 and which has a composition of 52 percent, by weight, in lactulose, 8.4 percent, by weight, in galactose, 6.5 percent, by weight, in lactose, 0.01 percent, by weight, in ash, and 33.09 percent, by weight, in water content and others. The aqueous lactulose solution was mixed with an aqueous solution of commercially available konnyaku powder (milled flour), gum arabic powder, pectin, locust bean gum and CMC, respectively, dissolved in warm water at a rate of 10 percent for lactulose or by directly adding AVICEL (cellulose crystals, manufactured by Asahi Chemical Industry Co., Ltd.) and NEUSILIN (Aluminum magnesium silicate, manufactured by Fuji Chemical Industry Co., Ltd.), respectively, to the aqueous lactulose solution. The respective aqueous lactulose solutions were dried under the conditions commonly used for drying foodstuffs, i.e., at a hot air inlet temperature of 170° C. and outlet temperature of 90° C. and at a rotation velocity of atomizer of 9,000 r.p.m. by means of a spray dryer (manufactured by Anhydro Co.). As a result, it has been found that when using commercially available gum arabic powder, pectin, locust bean gum or CMC, a viscous lump is adhered to the inner wall of the dryer and a free flowable powder could not be obtained. When using AVICEL or NEUSILIN, a yellow powder was obtained, but when dissolving the powder in water, crystals of AVICEL or NEUSILIN remained insoluble and a uniform aqueous solution of lactulose could not be obtained. However, the present inventors have found that when using commercially available konnyaku powder, a free flowable white powder is obtained and this powder is very easily soluble in water.

DETAILED DESCRIPTION OF PREFERRED EMBODIMENTS

The process of the present invention is a novel process for preparing a lactulose powder containing above 55 percent of lactulose in solid content. According to this technique, an aqueous solution containing above 60 percent, by weight, lactulose in total solid content, which is below 7.0 in pH, is mixed with an aqueous solution having dissolved therein, above 0.3 percent, by weight, based on the weight of lactulose, of konnyaku powder and drying the resulting mixture.

The process of the present invention will be explained in detail as follows:

1. Aqueous solution containing lactulose

In the present invention an aqueous solution of lactulose, prepared by ordinary manufacturing methods can be used. However, since it is the intent of the present invention to prepare a lactulose powder as the final product, the lactulose in solid content should be as high as above 55 percent, by weight. Any aqueous solution containing above 57.5 percent, by weight, of lactulose in solid content may be theoretically used as a starting raw material. However, it is preferable to use an aqueous solution containing above 60 percent, by weight, of lactulose in solid content, since the lactulose content in the final product will be reduced because of moisture content, etc. If the pH of the aqueous solution of lactulose is over 7.0, the lactulose may be decomposed during the heat-drying step and the lactulose content will be reduced. The aqueous solution of lactulose is desirably below 7.0 in pH.

2. Aqueous solution having dissolved konnyaku powder (hereinafter referred to as konnyaku solution for short)

In the present invention, an aqueous solution of lactulose and a konnyaku solution containing above 0.3 percent, based on the weight of lactulose, of konnyaku powder are mixed.

Konnyaku powder used in the present invention may be a commercially available konnyaku powder (milled flour), which is desirably further milled for use in order to increase its swelling velocity in water, if necessary. This konnyaku powder is added to water or warm water and stirred to cause uniform swelling. The konnyaku powder is thus converted from the viscous gel-like state to a sol-like state with the increase in amount of water. From the viewpoint of viscosity of konnyaku solution, the amount of water used should be suitably about 100 to 300 times that of konnyaku powder, as shown in Table 1. Warm water may be substituted for water.

TABLE 1

Viscosity of Konnyaku Solution

| Amount of water, ml.per 1 g.of konnyaku powder | 100 | 150 | 200 | 250 | 300 | 350 |
|---|---|---|---|---|---|---|
| Viscosity (cP) | 2800 | 680 | 200 | 113 | 53 | 32 |

Note: 1. The viscosity was measured at 20° C, by means of a B-type viscometer according to conventional methods.
2. Water used had a pH of 6.5;
3. Viscosity is expressed in centipoise (cP).

When the konnyaku solution contains insolubles, it is filtered using a filter cloth of 50 to 150 in mesh. The filtrate is mixed with an aqueous solution of lactulose and stirred well. Filtration of the konnyaku solution may be carried out after it is mixed with the lactulose aqueous solution.

3. Amount of konnyaku powder used

Since the present invention consists in a process for mixing an aqueous solution of lactulose and a konnyaku solution and drying the resulting mixture, the ratio of konnyaku powder in the konnyaku solution to lactose in the aqueous solution is very important. In the above mentioned test, the present inventors have found that, when using konnyaku powder in an amount corresponding to 10 percent of that of lactulose, a free flowable and water soluble lactulose powder can be obtained. To determine the critical concentration, a series of lactulose solutions having the above mentioned composition and the respective konnyaku solutions, obtained by mixing 0 percent, 0.1 percent, 0.3 percent, 0.5 percent, 2 percent, 5 percent, 10 percent, and 25 percent, based on the weight of lactulose, of konnyaku powder (milled powder) with 100 times the amount of warm water (55° C.) while stirring, were mixed. Then the mixed solution was concentrated or diluted with water to adjust its viscosity to 50 to 250 cP and thereafter dried under the condition of 170° C. in hot air inlet temperature, 90° C. in air outlet temperature and 9,000 r.p.m. in rotation velocity of atomizer using a spray dryer (manufactured by Anhydro Co.). As a result, it was found that when the amount of konnyaku powder used was 0 percent and 0.1 percent, based on the weight of lactulose, a viscous lump which could not be powdered, was found to adhere onto the inner wall of the dryer. When using above 0.3 percent, based on the weight of lactulose, of konnyaku powder, a powder which is freely flowable and very easily soluble in water was obtained. Powders in which the amounts of konnyaku powder used ranged from 0.3 to 25 percent were allowed to stand at room temperature and at an average relative humidity of 53 percent. The hygroscopicity was determined by measuring their moisture content with time. The results are shown in Table 2.

TABLE 2

Hygroscopic Test of Lactulose Powder

Moisture Content %

| Amount of konnyaku powder used for lactulose, % | Immediately after drying | After 10 days | After 20 days | After 30 days |
|---|---|---|---|---|
| 0.3 | 0.51 | 2.20 | 3.49 | 5.00 |
| 0.5 | 0.51 | 2.24 | 3.63 | 5.40 |
| 2 | 0.53 | 2.31 | 4.38 | 6.49 |
| 5 | 0.57 | 2.55 | 4.91 | 7.30 |
| 10 | 0.95 | 2.70 | 5.75 | 8.71 |
| 25 | 1.16 | 3.15 | 5.99 | 9.32 |

When konnyaku powder was used in the amount of 0.3 percent based on the weight of lactulose, after about 28 days the lactulose powder became lumpy and after 30 days it lost its free flowability entirely while, when using konnyaku powder in an amount of 0.5 to 25 percent, the free flowability was still maintained, although, as shown in Table 2, after 30 days, the moisture content tended to increase with time as the amount of konnyaku powder used was increased.

From the above results, it should be understood that the minimum amount of konnyaku powder to be used is 0.3 percent based on the weight of lactulose and when using more than 0.3 percent konnyaku powder, a powder which is freely flowable and is easily soluble in water and retains its good appearance and taste during extended periods of preservation can be obtained. There is no upper limit to the amount of konnyaku powder to be used, and it is only limited by the fact that the solid content of the final powder should contain at least 55 percent of lactulose in solid content. For example, when using an aqueous solution of lactulose in which the lactulose solid content is 80 percent, the amount of konnyaku powder used can be about 50 percent based on the weight of lactulose. However, such an embodiment is limited to special applications of the product, for example, for mixing the powder with another powder which is highly hygroscopic and tends to be deprived of free flowability, or for the preparation of a tablet. In order to obtain a powder which is high in lactulose content only, the amount of konnyaku powder used should desirably be as small as possible.

4. Mixing of Aqueous Solution of Lactulose and Konnyaku Solution

In the present invention, the mixed solution of aqueous solution of lactulose and konnyaku solution prepared, as described above, is desirably below a pH of 7. If the mixed solution is over 7 in pH, there is a risk that the lactulose can be decomposed during the heat-drying step. However, as described in (1), it is satisfactory if the aqueous solution of lactulose is adjusted to be below a pH of 7. The konnyaku solution, prepared by solubilizing konnyaku powder with tap water, drinking water, deionized water, etc., usually has a pH of about 6.5 because the konnyaku powder has kind of buffering action. Therefore, the pH of the aqueous solution of lactulose should be adjusted.

5. Drying

In the process of the present invention, the aqueous solution of lactulose and konnyaku solution are mixed and then dried to obtain a powder containing lactulose. This drying step can be accomplished by any drying method, such as spray drying method, drum drying method, freeze drying method, etc., as conventionally used for drying of foodstuffs. For the most effective drying, the mixed solution is desirably concentrated, or diluted with water, to render a viscosity of 50 to 250 cP.

As described above, a lactulose powder containing above 55 percent of lactulose in solid content and is freely flowable and easily soluble in water, can be obtained in accordance with the process of the present invention.

The effects obtained by the process of the present invention are as follows:

1. The powder obtained is higher in lactulose content than that obtained by prior art methods;
2. the powder obtained has the same degree of free flowability as the low lactulose content powder obtained by the prior art methods;
3. the powder obtained is easily soluble in water;
4. the powder obtained can be well preserved; and
5. the powder obtained is white and does not turn brown, even by passing the heat-drying step.

Having generally described the invention, a further understanding can now be attained by reference to certain specific Examples which are provided herein for purposes of illustration only, and are not intended to be limiting unless otherwise specified.

EXAMPLE 1

8/8 g. (0.5 percent based on the lactulose content) of commercially available konnyaku powder (milled powder, from Fukushima Prefecture, Japan) was added to 1.5 l. of water, while stirring, so as to cause uniform swelling. The solution was then filtered, using a 100-mesh filter cloth, to remove insolubles. The filtrate was added to 3 Kg. of an aqueous solution of lactulose having a pH of 6.5 and containing 52.0 percent of lactulose, 8.4 percent of galactose, 6.5 percent of lactose, 32.5 percent of water and 0.5 percent of others and mixed well. This mixed solution had a viscosity at 20° C. (measured by means of a B-type viscometer manufactured by Tokyo Keiki Co., Ltd. in accordance with the conventional method) of 140 cP. The mixed solution was heated to 45° C. and thereafter dried under the conditions of 170° C. in hot air inlet temperature, 90° C. in outlet temperature and 9,000 r.p.m. rotation velocity of atomizer by means of a spray dryer (manufactured by Anhydro Co.) to obtain 1.75 Kg. of a white powder which is 0.51 percent in moisture content, freely flowable and easily soluble in water. This powder contained 76.6 percent of lactulose in solid content.

EXAMPLE 2

31.2 g. (0.5 percent based on the lactulose content) of commercially available konnyaku powder (milled powder, from Fukushima Prefecture, Japan) was added to 6 liters of warm water at 55° C., while stirring, to cause swelling. The solution was filtered, using a 100-mesh filter cloth, to remove insolubles. The filtrate was added to 3 Kg. of lactulose aqueous solution having the same composition as in Example 1, and mixed well. This mixed solution had a viscosity at 25° C, (measured by a B-type viscometer manufactured by Tokyo Keiki Co., Ltd.) in accordance with the conventional method ) of 170 cP. The mixed solution was heated to 45° C., and, thereafter, dried under the conditions of 170° C. in hot air inlet temperature, 90° C. in outlet temperature and 9,000 r.p.m. rotation velocity of atomizer by means of a spray dryer (manufactured by Anhydro Co.) to obtain 1.82 Kg. of white powder which is 0.53 percent in moisture content, free-flowable and easily soluble in water. This powder contained 75.9 percent of lactulose in solid content.

EXAMPLE 3

78 g. (0.5 percent based on the lactulose content) of commercially available konnyaku powder (milled powder, from Fukushima Prefecture, Japan) was added to 15 liters of water, while stirring, to cause uniform swelling. The solution was filtered, using a 100-mesh filter cloth, to remove insolubles. The filtrate was added to 3 Kg. of an aqueous lactulose solution, having the same composition as in Example 1 and was mixed well. The viscosity of this mixed solution was 180 cP at 20° C. (measured by a B-type viscometer manufactured by Tokyo Keiki Co., Ltd. in accordance with the conventional method ). The mixed solution was dried under the conditions of 125° C. in drum surface temperature and 15 r.p.m. rotation velocity by means of a Kestner vacuum drum dryer. The dried product obtained was crushed by means of a crusher to obtain 1.90 Kg. of white powder which is 0.61 percent in moisture content, freely flowable and easily soluble in water. This powder contained 74.3 percent of lactulose in solid content.

EXAMPLE 4

29,4 g, (0.5 percent based on the lactulose content) of commercially available konnyaku powder (milled powder, from Fukushima Prefecture, Japan ) was added to 4.5 liters of water, while stirring, to cause uniform swelling and it was filtered using a 100-mesh filter cloth to remove insolubles. The filtrate was added to 3 Kg. of an aqueous lactulose solution of a pH of 6.4 and having a composition of 68.0 percent of lactulose, 1.2 percent of galactose, 0.1 percent of lactose, 30.0 percent of water and 0.7 percent of others, obtained by epimerizing lactose by the method of L. Gatzsche and H. Hänel (Ernährungsforschung, Vol. 12, No. 4, Page 641, 1967), and, thereafter, oxidizing the byproduced aldose using the method of Edna M. Montgomery (*Method in Carbohydrate Chemistry*, Vol. 1 Page 325, Academic Press, 1962), and mixed well. This mixed solution had a viscosity of 140 cP at 20° C. (measured by a B-type viscometer manufactured by Tokyo Keiki Co., Ltd. in accordance with conventional methods). The mixed solution was poured into a dish for freeze drying and, after prefreezing at −30° C., it was dried by means of a freeze dryer (RL–50 KW type, manufactured by Kyowa Vacuum Co., Ltd., an oil rotary vacuum pump of 500 l./min. in exhaust volume and $10^{-3}$ mmHg in maximum vacuum). The dried product obtained was crushed to obtain 2.02 Kg. of white powder, which is 0.59 percent in moisture content, freely flowable and easily soluble in water. This powder contained 96.0 percent of lactulose in solid content.

Having now fully described the invention, it will be apparent to one of ordinary skill in the art, that many changes and modifications can be made thereto without departing from the spirit or scope of the invention.

Accordingly, What is claimed and intended to be secured by Letters Patent of The United States is:

1. A process for preparing a lactulose powder containing above 55 percent of lactulose in solid content which comprises mixing an aqueous solution, having a pH of below 7.0 and which contains above 60 percent of lactulose in total solid content, with an aqueous solution having dissolved therein above 0.3 percent based on the weight of said lactulose, of konnyaku powder, and drying the resulting mixture.

* * * * *